Dec. 10, 1968  V. HUDELEY  3,415,003
TENSION ABSORBER FOR FISHING LINE
Filed April 11, 1966

VICTOR HUDELEY
INVENTOR.

BY

United States Patent Office 3,415,003
Patented Dec. 10, 1968

3,415,003
TENSION ABSORBER FOR FISHING LINE
Victor Hudeley, 50 Brd. Victor-Hugo,
Clichy, Hauts-de-Seine, France
Filed Apr. 11, 1966, Ser. No. 541,575
Claims priority, application France, Apr. 10, 1965,
12,766, Patent 1,468,691
10 Claims. (Cl. 43—42.72)

ABSTRACT OF THE DISCLOSURE

A tension absorber for a fishing line comprising a spiral spring-like member formed as a helix. The member has a helically extending slit along the outer periphery of its convolutions in which a fishing line may lie.

---

Attempts have been made in the past to find a simple, practical, and efficient means for absorbing excessive tension exerted by a fish on a fishing line. Such tension, when produced by a large fish, can result in breakage of the fishing line near the end of the rod as it is held by the angler. The concept of incorporating a rubber ring in a fishing line has been considered previously, but such an arrangement has involved the cutting of the fishing line and the tying of the two cut ends to the ring. The use of knots has the disadvantage of causing a partial cutting of the ring, which cutting is soon aggravated by wear and results in complete breakage of the line. This, in turn, causes the loss of the fish and the tackle. These and other difficulties experienced with the prior art devices have been obviated in a novel manner by the present invention.

It is, therefore, an outstanding object of the invention to provide a tension absorber for a fishing line which will assist in preventing breakage of the line and loss of tackle.

Another object of this invention is the provision of an attachment for fishing line which will provide resilient force absorption for the line, which attachment is easily applied to a line without cutting the same.

A further object of the present invention is the provision of a force absorption for a fishing line which does not necessitate cutting of the line or the use of knots.

It is another object of the instant invention to provide a resilient attachment for fishing line which is simple in construction, which is inexpensive to manufacture, and which is capable of a long life of useful service.

With these and other objects in view, as will be apparent to those skilled in the art, the invention resides in the combination of parts set forth in the specification and covered by the claims appended hereto.

Figure 1:
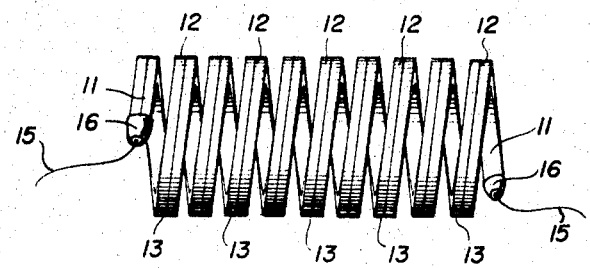
Figure 2:
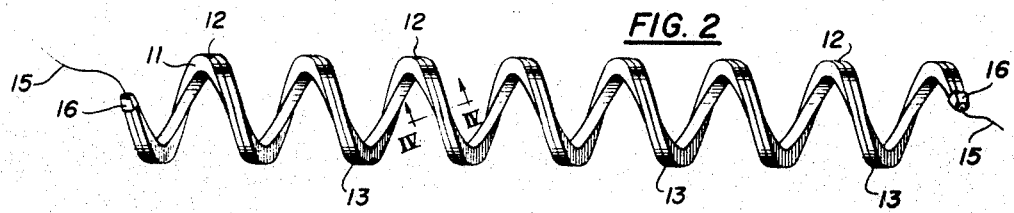
Figure 3:
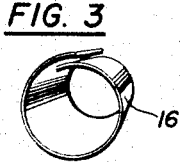
Figure 4:
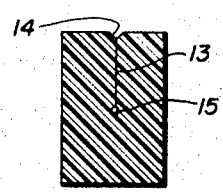
Figure 5:
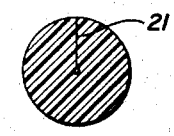

The character of the invention, however, may be best understood by reference to one of its structural forms as illustrated by the accompanying drawings in which:

FIG. 1 is a perspective view of a tension absorber incorporating the principles of the present invention, FIG. 2 is a similar view of the absorber in extended condition, FIG. 3 is a perspective view of a slide which is useful in connection with the invention, FIG. 4 is a sectional view of the absorber taken on the line IV—IV of FIG. 2, and FIGS. 5, 6, 7, and 8 represent sectional views of modifications of the invention.

Generally speaking, the present invention involves a detachable tension absorber for use on fishing lines which consists of a spiral spring formed of a continuous rod-like material formed as a helix which is provided with a continuous helically extending slit formed along the outer periphery of its convolutions, a line being insertable and retainable in the slit over its entire length.

As shown in FIGS. 1 and 2, the tension absorber is shown as comprising a spring 11 of the spiral type having, in the preferred embodiment shown in the drawing, ten turns 12 and consisting of nine full turns plus two half-turns at each end. This arrangement prevents any pronounced torsional effect on the fishing line.

The spiral spring 11 is formed as a solid core which, as is shown in FIG. 4, is rectangular in cross-section and has a slit 13 extending along its outer periphery in the direction of the major dimension. In the preferred embodiment, the outer lip of the slit is provided with a bevel 14. A secure connection of the ends of the absorber with a fishing line 15 is made by the provision of a truncated spiral slide 16 formed of a spring material and shown in detail in FIG. 3. This slide can be further fixed in place by the use of adhesive tape, or the like.

As is evident by an inspection of the drawings, it is not necessary to cut the fishing line when connecting it to the absorber or to attach it by the use of knots. The diameter of the turns 12 and the size of the cross-section of the spiral may be selected to be adapted to the various diameters of the fishing lines to be used. The tension absorber is positioned on the fishing line by making use of the bevel 14. The angler holds the absorber in his left hand and inserts the line 15 in the slit 13 by pressing it into the bevel 14 with the thumb and first finger of the right hand and winds the line externally in this slit along all the turns of the spiral. Then, the angler inserts the slide 16 on each end of the spiral to lock the absorber in place on the line. He may use a small strip of adhesive tape to assure that the two slides remain in place on the ends of the absorber.

The tension absorber is detachable; that is to say, when fishing is concluded, it may remain mounted on the fishing line, or it can be separated therefrom by unwinding after the ends have been disengaged. During fishing, when a fish exerts a violent unexpected pull on the line, the tension absorber extends out in the manner shown in FIG. 2, as also does the fishing line which is connected thereto. This avoids in the majority of cases breaking of the fishing line where a large fish is on the line.

When the spring is extended in the manner shown in FIG. 2 and the tension is released, a retraction takes place which causes an automatic striking of the fish which generally coincides with the strike used by the angler by manipulation of his rod. The tension absorber also plays a part in absorbing this strike when the angler uses a float which indicates to him the pull of the fish on the fishing line.

The tension absorber which has been described may be produced in various colors and may be formed by the injection molding process, it may be formed mechanically on a lathe with a grooved mandrel corresponding to the pitch of the spiral, or it may be formed by extrusion with a suitable extrusion nozzle. Preferably, the spring is constructed of any suitable elastic material, such as rubber or an elastomeric plastic such as polyurethane. It is possible to increase or diminish the number of turns of the absorber, but they would usually be between five or ten in number.

Figure 6:
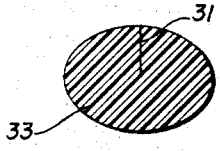
Figure 7:
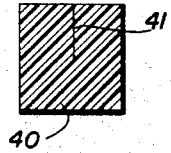
Figure 8:
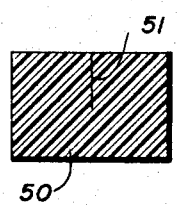

The cross-section of the spiral may be of several forms. For instance, in FIG. 5, the section is shown as circular with a slit 21 extending radially. In FIG. 6, the absorber 30 is shown as an ellipse having a slit 31 extending inwardly along a minor axis. In FIG. 7, the absorber 40 is shown as a square having a slit 41 which extends parallel to two opposed sides. In FIG. 8, the section of the absorber 50 is shown as a rectangle having a slit 51 which extends across the width of the rectangle.

The invention having been thus described, what is claimed as new and desired to secure by Letters Patent is:

1. A tension absorber for use on fishing lines, comprising a spiral spring consisting of a continuous rod-like material formed as a helix and provided with a continuous helically-extending slit along the outer periphery of its convolutions and said slit extending radially into the body of said rod-like material and along its entire length, whereby a line is insertable and retainable in the slit over its entire length.

2. A tension absorber as recited in claim 1, wherein a truncated spiral slide is provided to secure the line to the ends of the spiral spring.

3. A tension absorber as recited in claim 1, wherein the width of the slit is less than the diameter of the fishing line so that the latter once connected to the tension absorber cannot be separated therefrom without manual intervention.

4. A tension absorber as recited in claim 1, wherein the slit is enlarged at the external surface of the outer periphery to facilitate insertion of the line.

5. A tension absorber as recited in claim 1, wherein the rod-like material is of rectangular cross-section.

6. A tension absorber as recited in claim 1, wherein the spiral is constructed of a resilient material selected from the group consisting of rubber, plastic material, and elastomeric polyurethane.

7. A tension absorber as recited in claim 1, wherein the rod-like material is provided with an elliptical cross-section.

8. A tension absorber as recited in claim 1, wherein the rod-like material is of circular cross-section.

9. A tension absorber as recited in claim 1, wherein the rod-like material is of square cross-section.

10. A tension absorber as recited in claim 1, wherein the rod-like material is of rectangular cross-section where the long dimension of the rectangle extends transversely of the major axis of the spiral and the slit extends radially inwardly of the spiral in the direction of the long dimension of the rectangle.

References Cited

UNITED STATES PATENTS

| | | | |
|---|---|---|---|
| 596,385 | 12/1897 | Simon | 43—42.24 X |
| 1,023,676 | 4/1912 | Pancoast | 43—44.89 X |
| 1,296,057 | 3/1919 | Ellsworth | 43—42.72 |
| 2,690,026 | 9/1954 | King | 43—42.24 X |
| 3,011,284 | 12/1961 | Sawyer | 43—42.72 |

SAMUEL KOREN, *Primary Examiner.*

J. H. CZERWONKY, *Assistant Examiner.*

U.S. Cl. X.R.

43—42.24, 44.89